(12) United States Patent
Meffert et al.

(10) Patent No.: US 8,394,279 B2
(45) Date of Patent: Mar. 12, 2013

(54) METHOD FOR REGENERATING A FILTER AID

(75) Inventors: Helmut Meffert, Bobenhoim am Berg (DE); Marianna Pierobon, Ludwigshafen (DE); Tobias Petsch, Mörschied (DE); Julia Brodersen, Mannheim (DE); Hermann Josef Feise, Kleinniedesheim (DE); Ates Erk, Karlsruhe (DE); Jörg Kreβ, Mannheim (DE); Ralf Mar, Hochspeyer (DE); Ralf Lachmuth, Bobenheim am Berg (DE); Robert Bayer, Sinsheim (DE)

(73) Assignee: BASF SE, Ludwigshafen (DE)

( * ) Notice: Subject to any disclaimer, the term of this patent is extended or adjusted under 35 U.S.C. 154(b) by 333 days.

(21) Appl. No.: 12/531,388

(22) PCT Filed: Mar. 14, 2008

(86) PCT No.: PCT/EP2008/053129
§ 371 (c)(1),
(2), (4) Date: Mar. 17, 2010

(87) PCT Pub. No.: WO2008/110632
PCT Pub. Date: Sep. 18, 2008

(65) Prior Publication Data
US 2010/0176069 A1 Jul. 15, 2010

(30) Foreign Application Priority Data
Mar. 15, 2007 (EP) .................................. 07104260

(51) Int. Cl.
*B01D 37/02* (2006.01)

(52) U.S. Cl. ........ 210/797; 210/777; 210/791; 210/792; 210/193

(58) Field of Classification Search .................... None
See application file for complete search history.

(56) References Cited

U.S. PATENT DOCUMENTS

| | | | |
|---|---|---|---|
| 5,484,620 A * | 1/1996 | Oechsle et al. ............... 426/422 |
| 5,801,051 A * | 9/1998 | Kiefer et al. .................. 435/262 |
| 6,117,459 A * | 9/2000 | Van Den Eynde et al. ....... 426/7 |
| 7,993,533 B2 * | 8/2011 | Meffert et al. ................. 210/797 |
| 2004/0094486 A1 | 5/2004 | Drohmann et al. |
| 2005/0051502 A1 * | 3/2005 | Gottkehaskamp ............ 210/777 |
| 2005/0145579 A1 * | 7/2005 | Drohmann et al. ........... 210/777 |

(Continued)

FOREIGN PATENT DOCUMENTS

| CA | 2076745 A1 | 6/1992 |
|---|---|---|
| DE | 19625481 A1 | 1/1998 |

(Continued)

OTHER PUBLICATIONS

Verfahrenstechnik Filtration, GTM Mar. 2006, pp. 44-46.

*Primary Examiner* — Robert James Popovics
(74) *Attorney, Agent, or Firm* — Novak Druce Connolly Bove + Quigg LLP

(57) ABSTRACT

Methods for regenerating filter aids which comprise inorganic, natural or semisynthetic filter aids. The method comprises subjecting the filter aid to a first treatment with an aqueous alkaline solution, treating the filter aid with enzymes, treating the filter aid with a surfactant, and subjecting the filter aid a second treatment with the aqueous alkaline solution. The enzyme treatment and the surfactant treatment steps may be carried out simultaneously or in any order.

17 Claims, 16 Drawing Sheets

U.S. PATENT DOCUMENTS

2009/0291164 A1* 11/2009 Meffert et al. .................. 426/12
2010/0176069 A1* 7/2010 Meffert et al. ................ 210/797

FOREIGN PATENT DOCUMENTS

| | | |
|---|---|---|
| DE | 196 52 499 A1 | 6/1998 |
| EP | 0253233 A2 | 7/1987 |
| EP | 0611249 A1 | 1/1994 |
| EP | 0525166 B1 | 8/1995 |
| EP | 0879629 A1 | 11/1998 |
| EP | 1 338 321 A1 | 8/2003 |
| GB | 2288608 A | 10/1995 |
| WO | WO-9211085 A1 | 7/1992 |
| WO | WO-9635497 A1 | 11/1996 |
| WO | WO-99/16531 A1 | 4/1999 |
| WO | WO-0232544 A1 | 4/2002 |
| WO | WO-03008067 A1 | 1/2003 |
| WO | WO-03084639 A2 | 10/2003 |
| WO | WO 2008037777 A1 * | 4/2008 |
| WO | WO-2008037777 A1 | 4/2008 |
| WO | WO 2008110632 A1 * | 9/2008 |

* cited by examiner

METHOD FOR REGENERATING A FILTER AID

CROSS-REFERENCE TO RELATED APPLICATIONS

This application is a national stage application (under 35 U.S.C. §371) of PCT/EP2008/053129, filed Mar. 14, 2008, which claims benefit of European application 07104260.0, filed Mar. 15, 2007.

FIELD OF THE INVENTION

The present invention relates to a method of regenerating filter aids which comprise either inorganic, natural or semisynthetic filter aids, preferably kieselguhr, perlite, aluminum oxide, glass, plant granules, wood fibers and/or cellulose, by treatment with aqueous alkaline solution and with use of enzymes and surfactants.

BACKGROUND OF THE INVENTION

Filter aids are taken to mean additives which are used in solid-liquid separation processes in order to ensure deposition of the solids with simultaneously sufficient permeability of the resultant filter cake by formation of a porous precoat layer on the actual filter medium and/or by incorporation into the filter cake structure.

As filter aids, use is made not only of inorganic substances such as, for example, kieselguhr, perlite or aluminum oxides, but also synthetic polymers. Which filter aids are used in individual cases depends also on the field of application. Semisynthetic filter aids within the meaning of the invention means modified natural substances which have been chemically or physically changed in their properties, such as modified cellulose for example.

In the filtration of beer, kieselguhr is one of the most frequently used filter aids.

For economic reasons it is advantageous when the filter aid is regenerable. Regeneration over a plurality of filtration-regeneration cycles is particularly advantageous.

WO 02/32544 (US 2004 094 486) describes coextrudates of polystyrene and water-insoluble polyvinylpyrrolidone and use thereof as regenerable filter aids, wherein, however, the regenerability is mentioned only in quite general terms.

WO 03/084639 (US 2005 014 5579) describes coextrudates made of thermoplastic polymers except for polystyrene, and water-insoluble polyvinylpyrrolidone and use thereof as regenerable filter aids, wherein, however, the regenerability is mentioned only in quite general terms.

WO 92/11085 (U.S. Pat. No. 5,484,620) describes filter aids based on agglomerates of crosslinked polyvinylpyrrolidone and fibrous thermoplastic polymers such as, for example, polyethylenes or polyamides, and use thereof as filter aids. Reference is made in quite general terms to the fact that the filter aids are regenerable.

EP 611 249 describes a method of regenerating a filter aid by adding enzymes and sodium hydroxide solution.

EP 253 233 describes the regeneration of kieselguhr only by means of sodium hydroxide solution, as result of which the polysaccharides of the microorganisms (beta-glucans) are not destroyed.

DE 196 25 481 describes the regeneration of kieselguhr in the presence of a mixture of nonionic and anionic surfactants and proteolytic enzymes.

DE 196 52 499 describes the regeneration of filter aids, wherein the filter aids are removed from the filter elements and treated in a separate vessel with enzyme solutions, weak alkalis and weak acids, and also with an oxidizing agent.

WO 03/008067 (US 2005 005 1502) describes the regeneration of the filter aids, wherein, on the intact filter cake, first rinsing with alkaline solution proceeds, and subsequently likewise on the intact filter cake, neutralization of the pH by rinsing with acid.

WO 96/35497 (U.S. Pat. No. 6,117,459) discloses the regeneration of filter aids made of synthetic polymers such as polyamide filter aids by washing with alkaline solution and washing with an enzymatic compound, wherein the treatment proceeds in situ or in the filter unit on the intact filter cake.

EP 879 629 describes an alkaline solution treatment of a suspended filter aid, and if appropriate an enzyme treatment.

GTM 3/2006 (Verfahrenstechnik Filtration, pages 44-46) describes regeneration of kieselguhr by means of NaOH and nitric acid by means of enzymes (beta-glucanase, protease) or a combination of the two methods, wherein 70% of the kieselguhr could be reused.

It has been shown, however, that the previously known regeneration methods for the filter aids to be treated according to the invention do not give satisfactory results. Depending on the regeneration procedure, virtually complete use of the filter aid over a plurality of filtration-regeneration cycles is impossible. To achieve a plurality of cycles, currently, per cycle, about 30% by weight of fresh filter aid must be added (Verfahrenstechnik Filtration, pages 44-46).

SUMMARY OF THE INVENTION

The good filtration properties of the fresh filter aid with respect to the pressure increase during filtration and also with respect to the filtering and washing resistances, in the case of the regenerated materials, are not retained over a plurality of cycles, but worsen from cycle to cycle until further use is finally impossible.

Customarily, filtration, resistances and washing resistances which, depending on the technical field of application and on the filter aid, exceed a certain value are not considered acceptable in practice, since otherwise excessive pressure rise rates occur during beer filtration which has uneconomically short filtration times as a consequence.

Filtration resistance denotes the product of fluid viscosity and flow resistance during filter cake build up, washing resistance denotes the product of fluid viscosity and flow resistance during flow through the already formed filter cake. Determination of the corresponding measured values is known to those skilled in the art and is described in VDI guideline 2762.

It was an object of the invention to develop a method of regenerating an inorganic, natural or semisynthetic filter aid which enables repeated use of the filter aid with economic value of filtration throughput and filter service life and also sufficient clarifying action, and also provision of such a regenerated material.

This object is achieved by a method of regenerating an inorganic, natural or semisynthetic filter aid which comprises first subjecting the filter aid to a treatment with aqueous alkaline solution, subsequently performing a treatment with an enzyme solution, subsequently thereto carrying out a treatment with a surfactant and a second treatment with aqueous alkaline solution, wherein the last two steps can proceed simultaneously or successively in any sequence. Preferably, the surfactant treatment proceeds before the second treatment with aqueous alkaline solution.

Using the method according to the invention, successful regeneration of the filter aid is possible over a plurality of filtration-regeneration cycles, wherein good filtration properties of the filter aid with respect to pressure rise during filtration and also the filtration and washing resistances in the regenerated material are retained, without fresh filter aid necessary therefor having to be added.

The method according to the invention is suitable for regenerating filter aids for any type of precoat filters having a precoat layer deposited on filter elements and/or continuous addition of the filter aid to the suspension to be separated.

The regeneration method according to the invention is suitable in particular for use in beer filtration. The regeneration method preferentially removes from filter aids impurities which have been filtered off, which in particular consist of yeast.

According to the invention the filter system denotes the filtration apparatus itself, that is to say, for example, in the case of a pressure filter, the pressure-resistant vessel and the filter element situated therein in which the filtration takes place. As filter elements, all devices known therefor can be present, such as, for example, filter candles or disc filter elements.

The regeneration method according to the invention is suitable preferably for individual filter aids such as kieselguhr, perlite, aluminum oxide, glass, plant granules, wood fibers and/or cellulose or mixtures thereof.

Kieselguhr is a pulverulent substance which principally comprises the silicone dioxide shells of fossil diatoms which have a very porous structure. Commercially, kieselguhr can be obtained, for example, from the companies Lehmann und Voss (for example Celite®), Dicelite or PallSeitzSchenk.

Perlite filter aids comprise volcanic obsidian rock and are produced by thermal expansion. Chemically these are aluminum silicate which is almost as inert as silica. The structure of perlite filter aids corresponds to spherical fragments which do not have the same porosity, as is the case with the filigree skeleton of diatoms. Commercially, perlite can be obtained, for example, from the companies Lehmann und Voss (Harbolite®) and Dicelite.

Preconditioned natural fibers from extract-free cellulose which are in part specially prepared in order to ensure high purities and also odor and flavor neutrality can likewise be used as filter aids. Cellulose filter aids are mechanically and chemically very stable, insoluble in virtually all media and almost pH neutral. Commercially they are distributed, for example, by J. Rettenmaier & Söhne (for example Arbocel®, Filtracel® and Vitacel® types).

The abovementioned materials are customarily set to defined particle size spectra by grinding and sorting processes based on size for use as filter aids. Mixtures of fractions of different particle size distributions can also be used.

The method according to the invention is carried out in such a manner that filter aids loaded with impurities, in particular originating from the beer yeast, are first subjected to a treatment with an aqueous alkaline solution. Suitable aqueous alkaline solutions are, especially, sodium hydroxide solution or potassium hydroxide solution, particularly preferably sodium hydroxide solution. The concentration of the alkaline solution is customarily 0.5 to 5% by weight solid base/l, in particular 1 to 5% by weight, particularly preferably 2 to 3.5% by weight. The treatment time is customarily between 15 and 180 minutes, preferably between 45 and 120 minutes.

An enzymatic treatment of the filter aid proceeds subsequently to the treatment with an aqueous alkaline solution. Advantageously, between the first treatment step of an alkaline and the enzymatic treatment, a wash step with cold or hot water is performed.

Before the treatment with an enzyme, the pH is customarily set to <pH 7, preferably to pH 3.5 to 5.5. The pH can be set using various acids, for example using mineral acids such as phosphoric acid, nitric acid, sulfuric acid or, in the case of glass apparatuses, also with hydrochloric acid. In addition, suitable acids are also citric acid, carbonic acid or lactic acid. In principle, suitable enzymes are all enzymes or enzyme mixtures which can lyse the biological material separated off in filtration, in particular yeast cells, such as, for example, beer yeasts, preferably they are proteases, glucosidases, amylases or pectinases. Such enzyme or enzyme mixtures are commercially available.

Suitable enzymes are preferably glucanases, particularly preferably β-1,3-glucanases. The enzymes are customarily used in the form of aqueous solutions. The suitable amount of enzyme depends on the activity of the respective enzyme and the loading of the non-filtered material and the filter cake with impurities. In addition to a beta-glucanase activity, other enzyme activities can also be present in the enzyme solution according to the invention.

The activity of the enzyme solution can be determined by those skilled in the art by simple experiments by studying what amount of enzyme is required to lyse a defined number of yeast cells. Then the enzyme dosage can proceed as a function of the turbidity or loading with yeast cells and the volume of the non-filtered material to be filtered.

The enzyme treatment can proceed at 25-60° C., preferably 40-50° C. The time is customarily between 30 and 300 min., preferably between 100 and 180 min.

The determination of active units can proceed as described hereinafter: one active unit U (unit) is defined according to the invention as the decrease in extinction at 800 nm by 0.04/min in an enzyme assay at pH 4.0 and 45° C. within the first 10 min. As substrate, use can be made in this assay of brewer's yeast at $1-3 \cdot 10^7$ cells/ml which has previously been treated with sodium hydroxide solution.

Based on the EBC value of the non-filtered material at 25° C. and with relation to the active units as described above, a dosage of 0.2 U/(EBC×hL) to 12 U/(EBC×hL) is advisable, preferably 1 to 5 U/(EBC×hL) (EBC: European Brewery Convention; standard test for determining turbidity values).

With respect to the yeast cell count in the filter cake to be regenerated, a dosage of 3 to 170 U/($10^{10}$ yeast cells) is advisable, preferably 5 to 85 U/($10^{10}$ yeast cells), in particular 5 to 20 U/($10^{10}$ yeast cells).

In addition the filter aid is treated with aqueous surfactant solution or surfactant dispersion. The concentration of surfactant based on the total weight of the solution can be 0.01 to 4% by weight, preferably 0.01 to 1.5% by weight, in particular 0.1 to 0.75% by weight.

Suitable surfactants are both ionic surfactants, in particular anionic surfactants, and nonionic surfactants. Mixtures of surfactants can also be used. Suitable ionic surfactants can be: fatty alcohol sulfates such as sodium dodecyl sulfate or ammonium dodecyl sulfate, fatty alcohol ether sulfates, alkyl sulfoacetates, fatty alcohol phosphoric acid esters, fatty alcohol ether phosphates, alcohol phosphoric acid esters such as triisobutyl phosphate, monoalkyl or dialkyl esters of sulfosuccinic acid such as dioctyl sodium sulfosuccinate, alkyl sulfonates, alkylbenzenesulfonates such as dodecylbenzenesulfonic acid. Nonionic surfactants which come into consideration are: fatty alcohol ethoxylates such as, for example, a C13-fatty alcohol having 6 EO units, alkylphenol ethoxylates, polyoxyethylene fatty acid esters, polypropylene glycol ethoxylates, fatty acid mono- and diglycerides and also the corresponding ethoxylates, fatty acid glycol partial esters, sorbitan fatty acid esters or polyoxyethylene sorbitan fatty acid esters.

Between the enzymatic treatment and the surfactant treatment, if desired, again a wash step with cold or hot water can proceed.

The treatment step with a surfactant can be followed by a further wash step with cold or hot water.

Subsequently to the surfactant treatment, advantageously a second treatment step with an aqueous alkaline solution proceeds under the conditions described for the first treatment step with an alkaline solution, wherein the conditions for the first and second treatment steps can be different from one another.

Treatment with the surfactant advantageously proceeds simultaneously with the second treatment step with aqueous alkaline solution. According to another embodiment of the method, the surfactant treatment can proceed in a separate upstream treatment step. According to a further method variant, it is also conceivable that the second treatment with an alkaline solution proceeds before the surfactant treatment.

The surfactant treatment step and/or the second treatment step with an aqueous alkaline solution can optionally proceed outside the filter system in a suitable vessel such as, for example, the device for enzyme treatment or, after renewed precoating of the filter aid onto a filter element, by throughflow on the filter.

The first treatment step with aqueous alkaline solution can proceed according to a method variant on the intact filter cake.

According to another method variant, the first treatment with aqueous alkaline solution can also be performed on a filter cake which has been removed from the filter system; the particle association of which filter cake is disintegrated, and which cake is present as aqueous slurry or suspension.

The method according to the invention is carried out according to an embodiment in such a manner that the step of the enzymatic treatment does not proceed in situ on an intact filter cake or a precoat layer, but that the filter cake is removed from the filter medium with destruction of the particle association and treated in a separate device, in particular outside the filter system. This separate device can be, for example, a kettle or any other suitable vessel, and is preferably equipped with an agitator device. Before the enzymatic treatment, the filter aid is then removed from the filter element with dispersion of the particle association in the filter cake, discharged from the filtration system and treated in a separate device. The enzymatic treatment proceeds according to this embodiment on an aqueous suspension or slurry of the filter aid which customarily has a solids content of 5 to 25% by weight.

After the enzymatic treatment, the treatment with a surfactant can likewise proceed on the aqueous slurry or suspension of the filter aid. Subsequently thereto, the second treatment step with aqueous alkaline solution can proceed either again on the suspension or aqueous slurry, or alternatively on a re-precoated filter cake.

According to another method variant, the filter aid is precoated in a suitable filter and the newly formed filter cake is subjected to the further treatment steps, the surfactant treatment and also the second alkaline solution treatment.

According to an alternative embodiment, the enzymatic treatment is carried out on the intact filter cake by flushing through the aqueous enzyme solution through the filter cake or admixing the enzyme solution to the filter cake and incubating it. Preferably, the filter cake is continuously flushed through with the enzyme solution, in order to ensure its stability and prevent it from falling off from the filter element.

According to this alternative embodiment, the treatment with the surfactant and also the second treatment step with aqueous alkaline solution, if desired in each case after a wash step, are carried out on the intact filter cake.

It is also possible to destroy the filter cake after the enzyme treatment and to perform the surfactant treatment and/or the second alkaline solution treatment in a suspension or aqueous slurry.

The regeneration steps which are performed on the intact filter cake can be carried out at all pressure differences between the feed side and filtrate side of the filter which firstly enable flow through the filter cake and secondly do not exceed the pressure strength of the filter housing. Customarily this pressure difference is between 1 kPa and 800 kPa.

The enzymatic treatment, and also, if appropriate, the first and/or the second treatment step of an alkaline solution, and also the surfactant treatment in the separate device, customarily proceed at atmospheric pressure. It is also conceivable that at least one of the steps is carried out at superatmospheric pressure.

The temperature of the aqueous alkaline solutions used for the regeneration, as also for the aqueous surfactants, can be 5 to 95° C.

In principle, the method steps carried out on the intact filter cake through which flow passes can, in each case independently of one another, either proceed in a circulation procedure with reuse of the liquid, or the liquids can be immediately discarded.

According to an embodiment, in the first treatment with aqueous alkaline solution, the solution is discarded, preferably completely. It is also conceivable that the aqueous alkaline solution is reused, at least in part, preferably purified, and used in a circulation procedure. Reuse of the alkaline solution can be meaningful from economic and waste-disposal aspects.

Preferably, in the individual wash steps, independently of one another the wash water is discarded, preferably completely. It is also conceivable that the, in particular hot, wash water is reused at least in part, preferably purified and used in a circulation procedure. The reuse or reprocessing of the in particular hot wash water is meaningful from wastewater disposal aspects and also energy aspects.

The enzyme treatment, surfactant treatment and also the second treatment with aqueous alkaline solution proceed, in each case advantageously independently of one another, at least in part in circulation procedure, in order to use the extensive material such as enzymes or surfactants firstly as long as possible, and secondly to produce as little as possible waste water. The circulation procedure of these active compound solutions further has the advantage that they do not each have to be heated to a corresponding temperature and therefor a continuous high energy supply is not necessary. It is also conceivable that the aqueous solutions of enzyme, alkaline solution and/or surfactant are discarded directly, in particular at the start of the respective step. This is conceivable, in particular, when corresponding enzymes can be produced considerably more economically, or the enzymes have sufficient activity at lower temperatures.

The completely regenerated filter aid can remain in the filter system and be used immediately for filtration. The regenerated filter aid can also be removed from the system and stored after drying.

Those skilled in the art are able, depending on beer type, turbidity and yeast load of the unfiltered material, to add fresh filter aid for precoating or dosage, for example having a different grain size, in order to react to changed solids properties. Depending on filtration and regeneration device, system-specific losses of filter aid, in particular as a result of leaks, breakthroughs during the wash steps or mechanical destruction of the filter aid during the regeneration steps, which a filter aid must be added back in order to ensure an appropriate running time of the subsequent filtration cycle. In this case iris possible to add either new or previously regenerated, in particular dry, filter aid from the outside.

In the method according to the invention, 0 to 20% by weight, preferably 0 to 10% by weight, in particular 0 to 5% by weight, filter aid can be exchanged and/or supplemented per cycle. This can be necessary, not owing to inadequate purification, but rather owing to losses of filter aid in the filter and regeneration system. In a particular embodiment, no filter aid is fed from the outside in the course of in total at least 5, preferably at least 10, regeneration cycles.

An important assessment feature for quality of the regeneration is the pressure rise with time, that is to say the pressure difference between feed and filtration sides of the filter in the beer filtration following regeneration. An excessive pressure increase or a rise of the pressure increase rate from cycle to cycle indicate incomplete regeneration of the filter aid. An approximately constant pressure increase rate from cycle to cycle which is in the region of that of the fresh product indicates sufficient regeneration.

The turbidity load in the unfiltered material customarily fluctuates and it has a considerable effect on the pressure rise rate. This effect can be eliminated to an approximation by normalizing the pressure difference using the respective unfiltered material turbidity (measured as 25°-EBC) normalized to a standard value.

A further important assessment criterion of the successive regeneration is the filtration resistance and washing resistance of the regenerated material. If these values are significantly increased compared with the fresh product and if they demonstrate a monotonic increase from cycle to cycle, likewise incomplete regeneration must be assumed.

The regenerated material according to the present invention is distinguished in that, even after repeated regeneration, preferably after 5-fold regeneration, in particular after 10-fold regeneration, it has a filtration resistance and/or a washing resistance of $1-10\times10^{12}$ mPa s/m², preferably $2-8\times10^{12}$ mPa s/m², in particular $2-7\times10^{12}$ mPa s/m². A very high degree of regeneration compared with other resistances achievable by conventional methods from the prior art is achieved thereby, which approximately corresponds to the qualities of the novel filter aid. Such a degree of regeneration makes possible frequent reusability and thereby a very economical and environment- and resource-sparing use of the filter aid. Regenerated material is taken to mean the inorganic, natural or semisynthetic filter aid which has been used at least one for filtration and subsequent regeneration according to the conditions as in Example 1 with respect to yeast cell count, precoating, filtration and regeneration.

The regenerated material according to the invention is further distinguished in that, after at least one filtration-regeneration cycle, preferably 3 filtration-regeneration cycles, in particular 5, it has a turbidity-normalized pressure difference during a three-hour filtration which is in the range of the novel material and is between 0.02 and 0.6 bar/h, preferably 0.02 and 0.5 bar/h, in particular 0.02 and 0.4 bar/h. The turbidity-normalized pressure is calculated in this case by division of the measured pressure by the quotient of the actual unfiltered material turbidity and a standard turbidity of 30 EBC (25°-EBC).

The regenerated material thus has approximately the same properties as the novel filter aid before the first regeneration. This has the advantage that low pressure-rise rates are achieved during filtration and long filtration service lives are possible.

The regenerated material according to the invention is preferably produced by means of the described method according to the invention.

In addition, a comprehensive microscopic investigation of the regenerated material offers a good possibility for assessing the success of regeneration.

The independent and dependent patent claims are made herewith by reference to the subject matter of the description.

Further features of the invention result from the description hereinafter of particular embodiments, figures and examples. In this case the features of the invention can be implemented individually or in combination. The examples serve for illustration and for better understanding of the invention and are in no way to be taken as restricting.

DETAILED DESCRIPTION OF THE PREFERRED EMBODIMENTS

Examples

Example 1

Kieselguhr Filtration by Candle Filter

The filtration was performed using turbid beer (Pits) using a candle filter (gap width of the candle filter 70 μm, filter area 0.032 m$^2$). The filter aid used was kieselguhr of differing fineness (designation DIC, CBR3 and CBL, from Pall GmbH SeitzSchenk).

Coating:

Precoating of 1500 g/m$^2$ was employed (25% DIC, 75% CBR3) which was filtered on with a volumetric flow rate of 30 l/h.

Filtration:

The beer was filtered with a volumetric flow rate of 15 l/h and with addition of 100 g/hL of kieselguhr (25% DIC, 50% CBR3, 25% CBL) for approximately 3 h in each case. The unfiltered material had a yeast cell count of 2-2.4·10$^6$.

Regeneration:

After completion of the beer filtration, a hot water treatment proceeded by flushing the still intact filter cake situated on the filter with drinking water (85° C.) for a time period of 15 min. at a throughput of 30 l/h. Subsequently the filter cake was flushed with aqueous 2% strength by weight NaOH (85° C.) for a time period of 15 min. with the flushing liquid being discarded, subsequently 45 min. long in a circulation procedure, in both cases at a throughput of 15 l/h. Thereafter flushing proceeded with 30 l/h of drinking water (5-10° C.) for removal of the residual volume of the NaOH solution in the system, and cooling for 20 min. Subsequently thereto an enzyme treatment proceeded, wherein, before the treatment, the filter cake was removed (slurrying and dilution to an approximately 10% strength by weight suspension), transferred to a stirred tank situated outside the filter and the pH was adjusted to pH 4 using citric acid. In the stirred tank there proceeded a treatment with an aqueous solution of a β-1,3-glucanase (Trenolin Filtro DF®, from Erbslöh) at pH 4 and 50° C. for 120 min. The amount of enzyme was 11 U/(EBC·hL). After completion of the enzyme treatment, by addition of NaOH (10% strength) and sodium dodecylsulfate (SDS, 10% strength), an NaOH concentration of 1% by weight and an SDS concentration of 0.5% by weight were established in the suspension and the system was treated in the stirred tank at 85° C. for 15 min. Subsequently, the solid was again precoated onto the filter candle in a circulation procedure at 30 l/h and likewise flushed at 30 l/h first for 15 min with drinking water (85° C.) and subsequently for approximately 15 min with drinking water (5-10° C.). After this procedure, the regenerated material was removed from the filter system and stored temporarily in a vessel for the following filtration-regeneration cycle.

Figure 1:
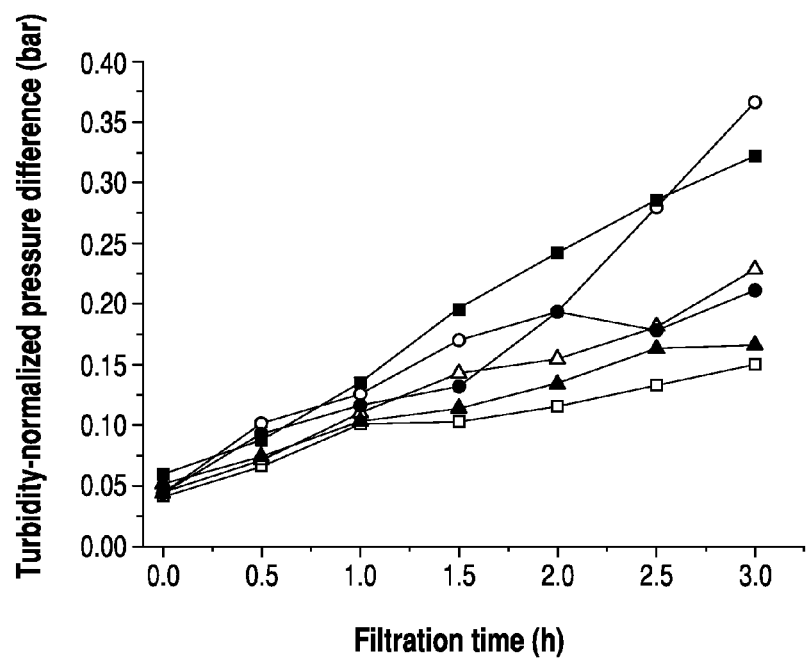
FIG. 1 shows the turbidity-normalized pressure difference as a function of filtration time (normalization to 30 EBC)) (25°) from Example 1 having the cycle numbers: ■-1, □-2, ▲-3, ∆-4, ○-5, ●-6
Figure 2:
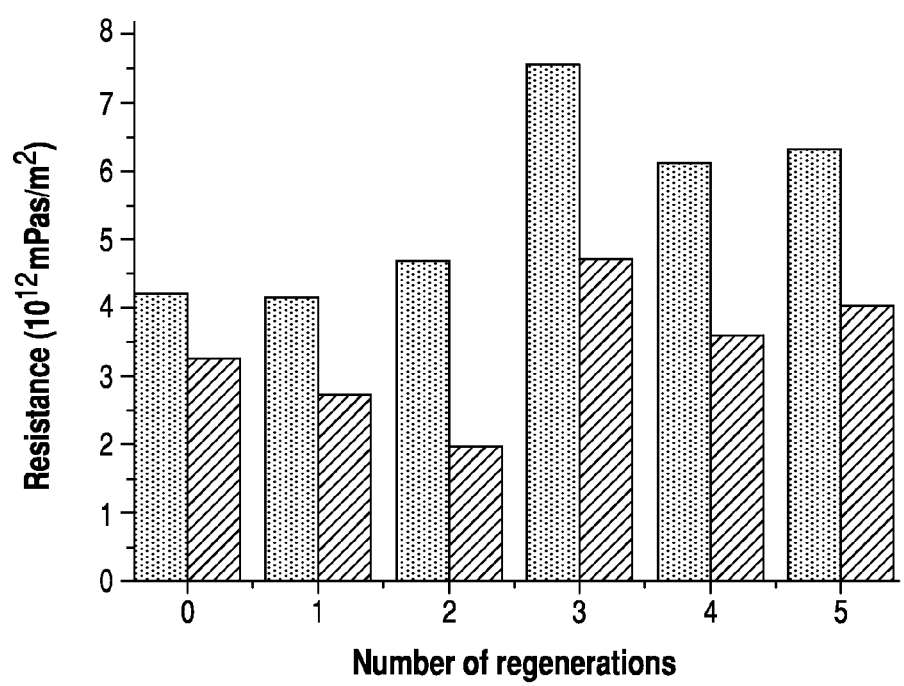
FIG. 2 shows the filtration resistances (gray) and washing resistances (hatched) as a function of the number of regenerations of the filter aid of Example 1
Figure 3:
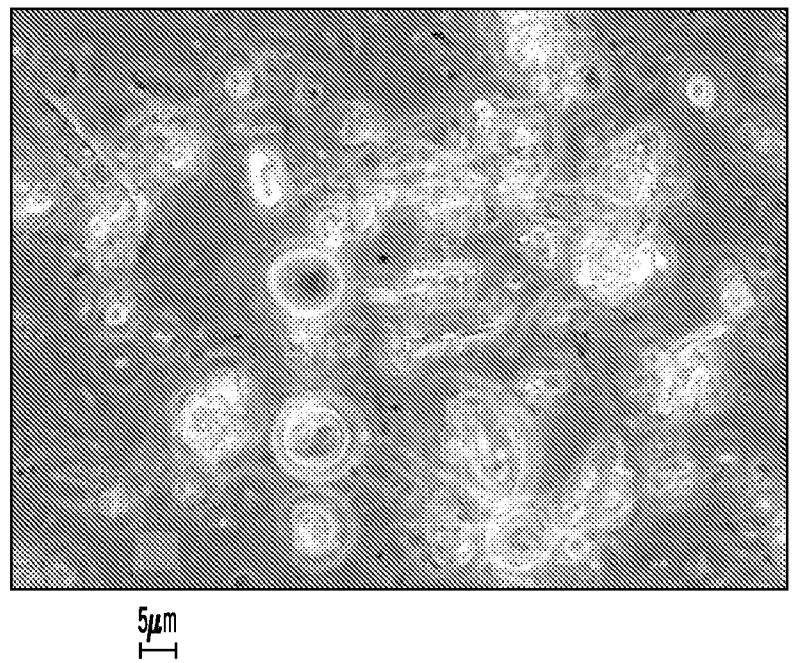
FIG. 3 shows a micrograph of the filter aid kieselguhr after the $1^{st}$ filtration of Example 1
Figure 4:
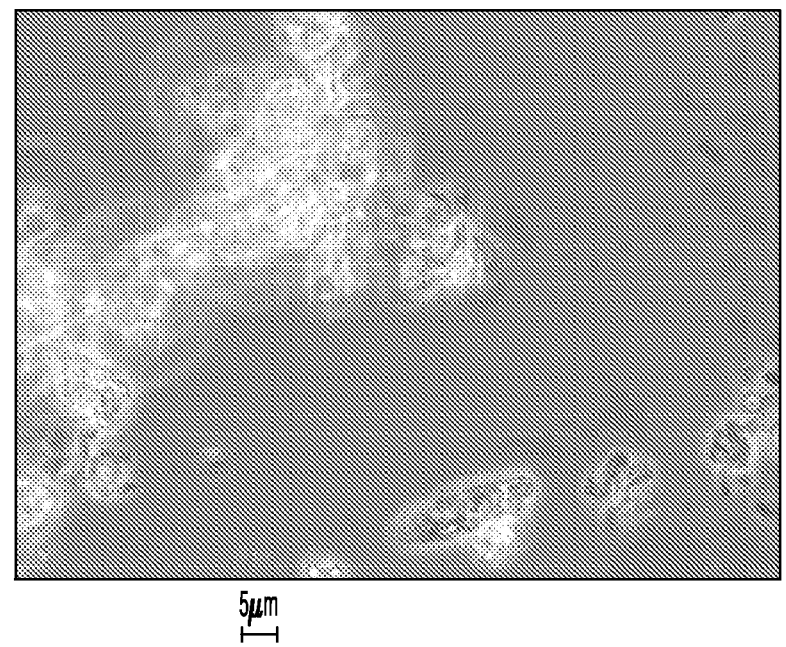
FIG. 4 shows a micrograph of the filter aid kieselguhr after the $1^{st}$ regeneration of Example 1
Figure 5:
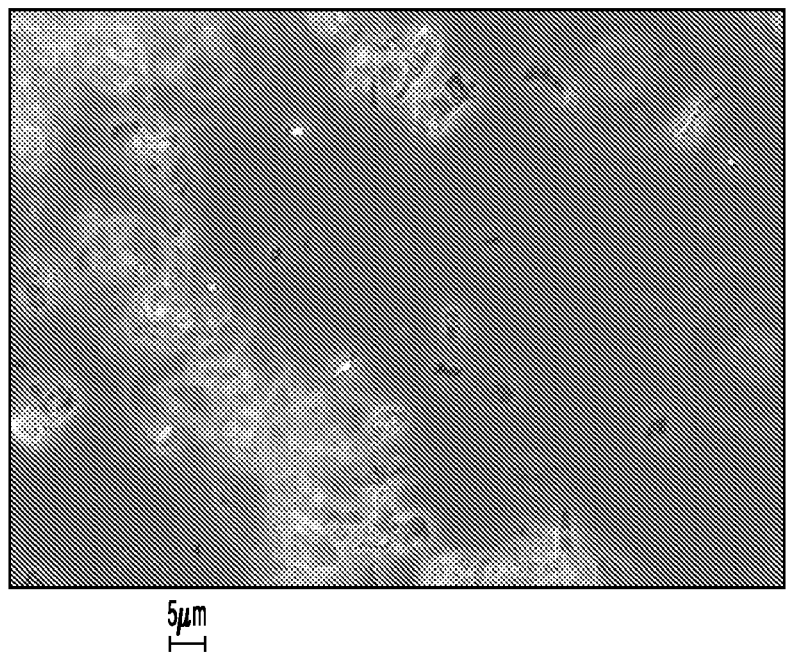
FIG. 5 shows a micrograph of the filter aid kieselguhr after the $2^{nd}$ regeneration of Example 1
Figure 6:
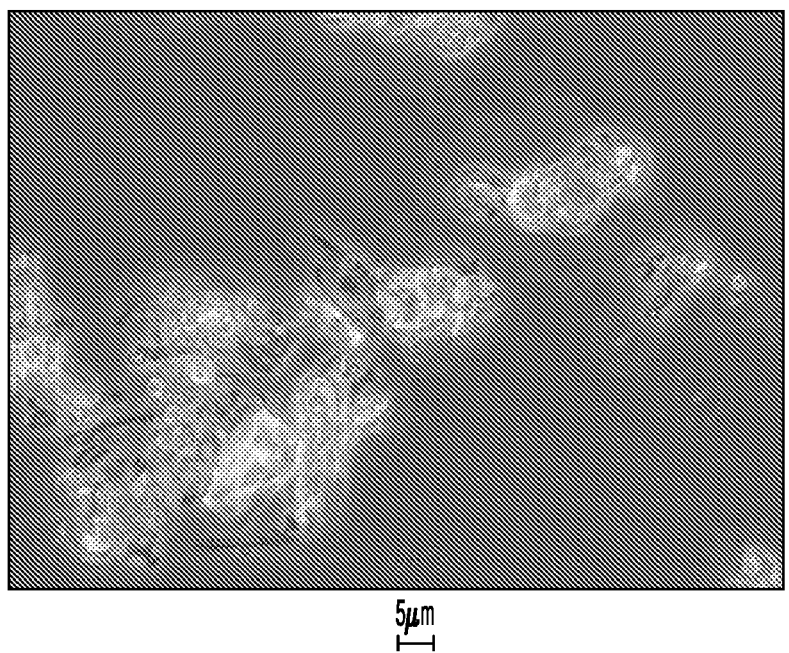
FIG. 6 shows a micrograph of the filter aid kieselguhr after the $3^{rd}$ regeneration of Example 1
Figure 7:
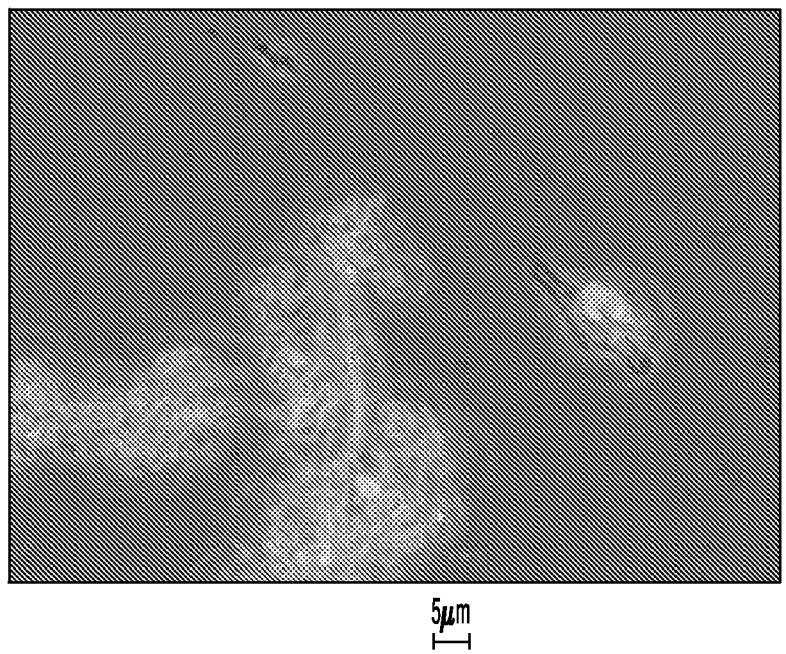
FIG. 7 shows a micrograph of the filter aid kieselguhr after the $4^{th}$ regeneration of Example 1
Figure 8:
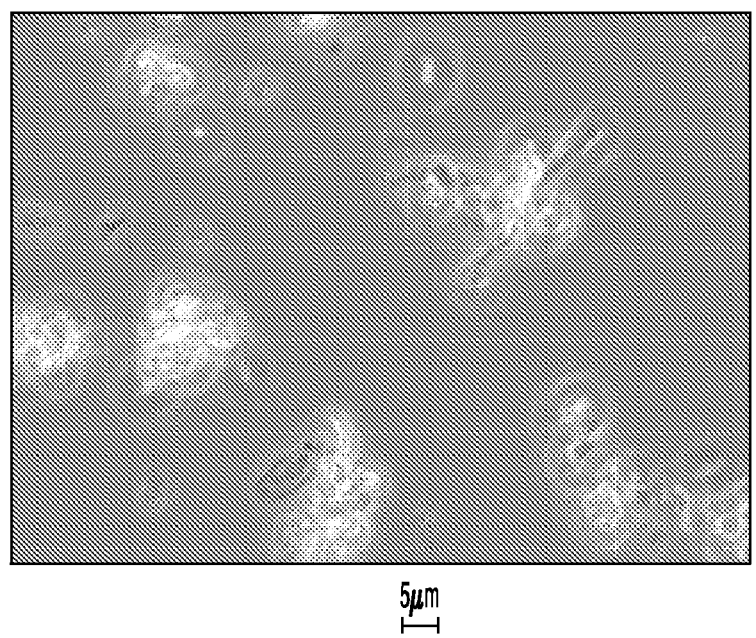
FIG. 8 shows a micrograph of the filter aid kieselguhr after the $5^{th}$ regeneration of Example 1
Figure 9:
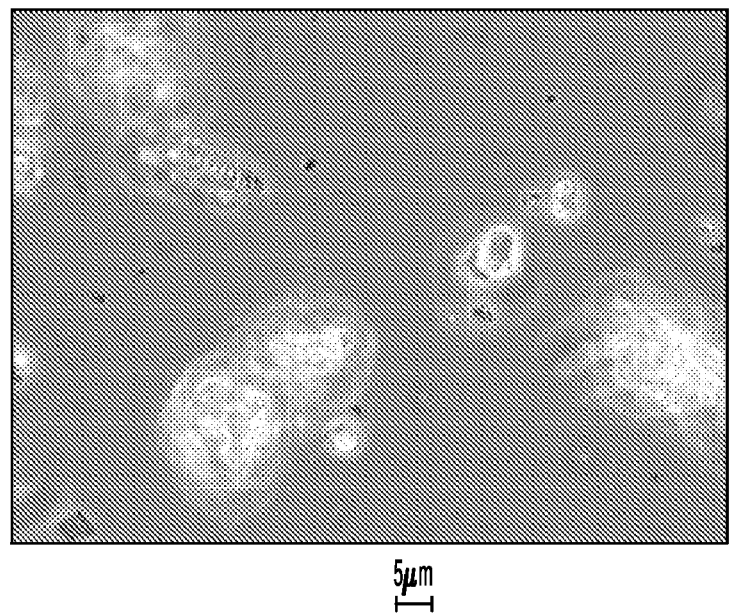
FIG. 9 shows a micrograph of the filter aid kieselguhr after the $6^{th}$ regeneration of Example 1

The regeneration was assessed firstly microscopically and secondly by determining the filtering and washing resistance (VDI guideline 2762, 20° C.). The washing resistance was determined with a flow of 50-100 g of water (20° C.) through a regenerated filter cake of thickness approximately 5-20 mm. A further assessment criterion was the time course of the pressure rise during the following beer filtration. The pressure rise curves for Example 1 can be seen in FIG. 1. 6 filtrations were carried out each with intermediate regenerations. The regenerated materials are distinguished by equivalent or slightly lower pressure rise rates compared with the fresh product which confirms a high regenerated quality. The filtering and washing resistances of the regenerated materials (FIG. 2) are below 1·10$^{13}$ mPas/m$^2$ and exhibit only experimentally-related variations, but no continuous increase from cycle to cycle, which likewise confirms successful regeneration. The same applies for the microscopic assessment of the regenerated materials (FIGS. 3-9).

FIGS. 3-9 show micrographs of kieselguhr after successful filtration and subsequent regeneration of a plurality of cycles. After none of the 6 regenerations shown are whole yeast cells or even only part thereof displayed. Therefore the lysis proceeds completely in each case and the quality of the regenerations must be rated as very good.

Example 2

Filtration Using Perlite or Pure Cellulose With Use of a Laboratory Pressure Nutsche Hereinafter, regeneration experiments are described, in each case using perlite or cellulose. The materials were investigated after beer filtration was completed for their regenerability. The perlite used is the Harbolite type (from Lehmann & Voss; mixture of 50% by weight Harbolite 300 and 50% by weight Harbolite 635). The cellulose used originates from the company J. Rettenmaier & Söhne (Arbocel BE 600/10). The types were selected in accordance with the retention with respect to beer turbidity materials.

The description hereinafter applies both to experiments with perlite and with cellulose. First, filter aid loaded with beer turbidity materials was produced using a pressure nutsche (20 cm$^2$ filter area) and a reservoir vessel (10 L, stirred). In this case, first a precoating layer of the filter aid was precoated on the filter medium (2000 g/m$^2$). Subsequently, filter aid and unfiltered beer (Pils, 8 L) were mixed with one another in the reservoir vessel (concentration of the filter aid: 100 g/hL) and filtered with stirring through the nutsche provided with the precoating layer. In this case the pressure difference was tracked (0.1-3.5 bar) in such a manner that a roughly constant filtrate volumetric flow rate resulted. The filtrate was almost clear. After completion of filtration, the material was regenerated as follows: the loaded filter cake was removed from the nutsche and diluted with demineralized water (DMW) so that a suspension having approximately 10% solids content was present. This suspension was set to a final concentration of 1% NaOH by addition of 50% strength aqueous NaOH and incubated at 85° C. for 60 min. The suspension was subsequently filtered (pressure nutsche, 20 cm$^2$ filter area) and the resultant filter cake was washed 5 times, each time with 200 ml of DMW. Thereafter the cake was removed and the system subsequently diluted with DMW, so that again an approximately 10% strength by weight suspension was present. After addition of 11 U/(EBC·hL) of β-glucanase (Trenolin Filtro DF®, from Erbslöh), the suspension was incubated for 2 h at pH 4 and 50° C. Subsequently, an SDS concentration of 0.5% and an NaOH concentration of 1% were set using SDS 10% strength and aqueous NaOH 50% strength and the system was incubated at 20-25° C. for 15 min. Subsequently, the solid was filtered off using a laboratory pressure nutsche (see above) and washed 5 times, each time with 200 ml of DMW (20-25° C.) (flow-through washing). Unregenerated material and regenerated material were assessed microscopically.

Figure 10:
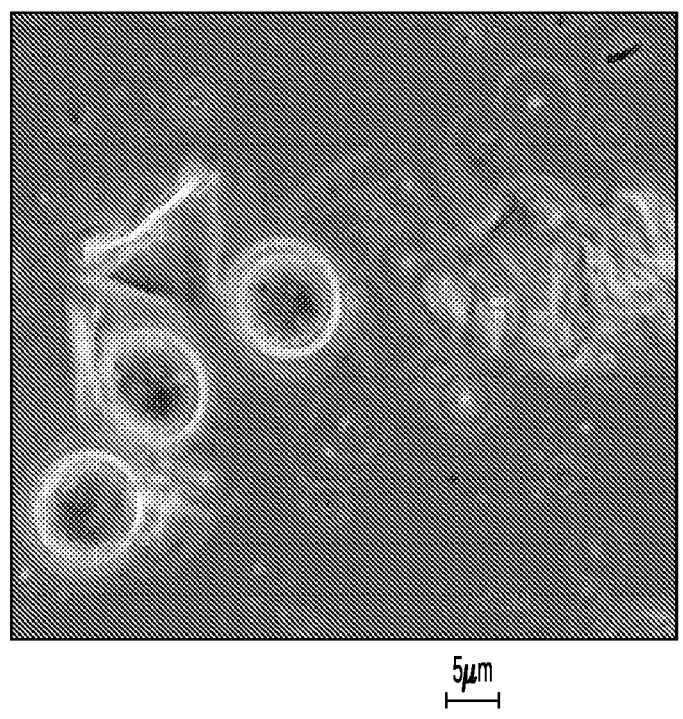
FIG. 10 shows a micrograph of the filter aid perlite after the filtration of Example 2
Figure 11:
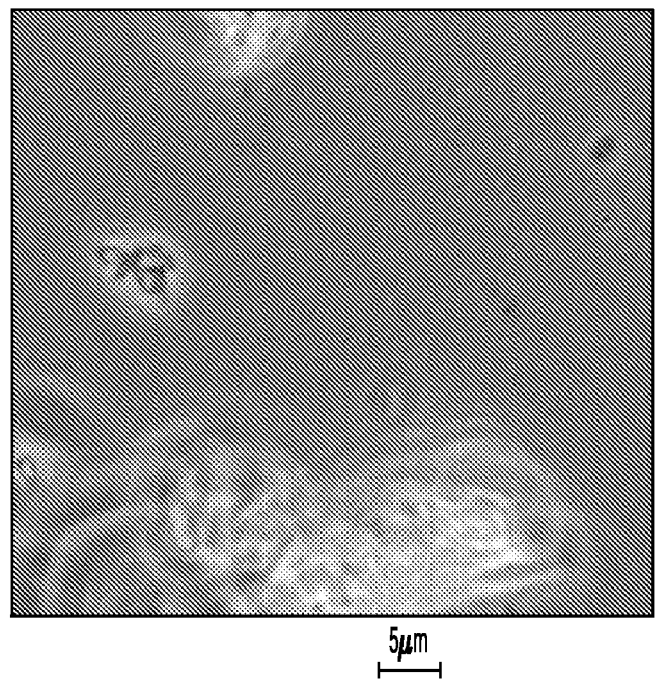
FIG. 11 shows a micrograph of the filter aid perlite after the regeneration of Example 2

For the regeneration of perlite (FIGS. 10 and 11), the micrographs show that the yeast cells and further dirt particles have been successfully removed.

Figure 12:
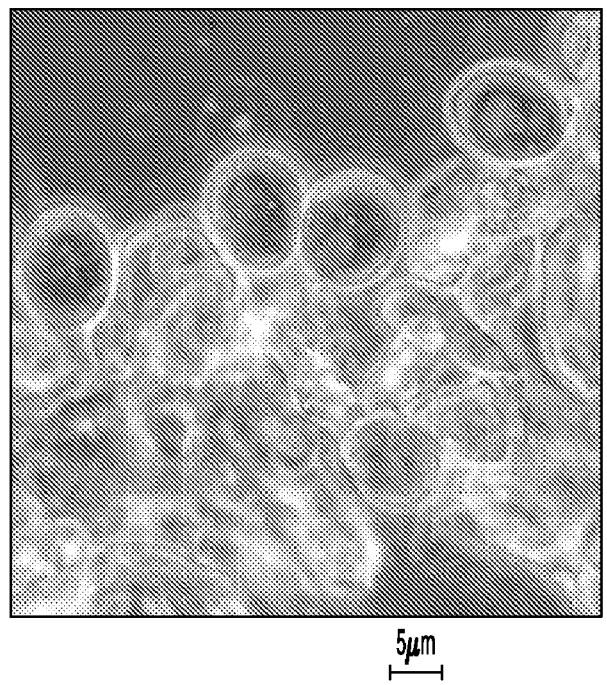
FIG. 12 shows a micrograph of the filter aid cellulose after the filtration of Example 2
Figure 13:
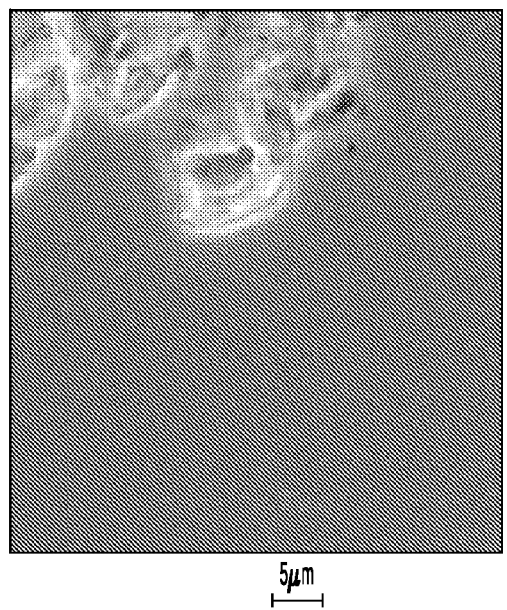
FIG. 13 shows a micrograph of the filter aid cellulose after the regeneration of Example 2

For the regeneration of cellulose (FIGS. 12 and 13), the micrographs likewise show that the yeast cells and further dirt particles have been successfully removed.

Figure 14:
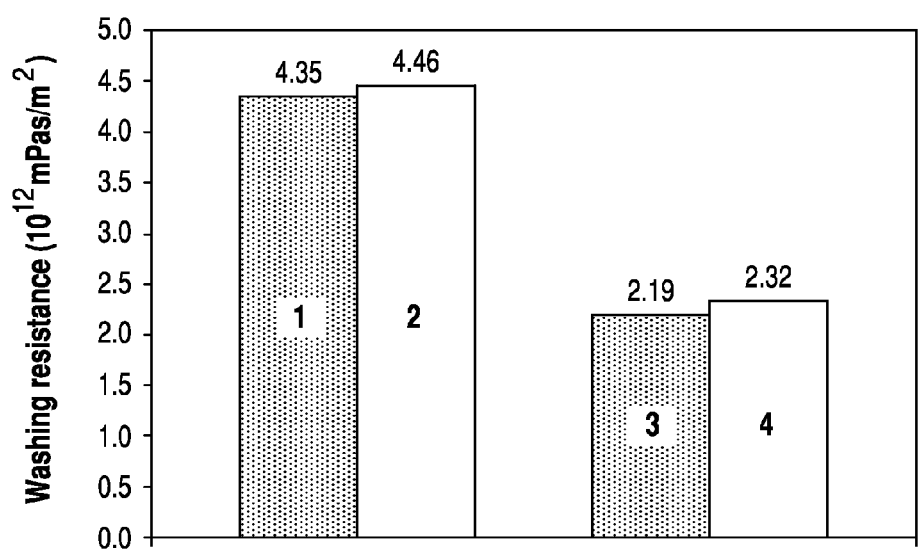
FIG. 14 shows the washing resistances of filter aid perlite (1 fresh, 2 after regeneration) and of cellulose (3 fresh, 4 after regeneration) of Example 2

Subsequently, the filtering resistance and washing resistance of the respective regenerated materials were measured in accordance with VDI guideline 2762 and compared with those of the unloaded filter aid (FIG. 14). The results show that the respective washing resistances of the starting samples and of the regenerated materials are identical within the limits of accuracy of measurement.

Therefor, based on the filtration properties, successful regeneration both of periite and of cellulose can be assumed.

Example 3

Kieselguhr Filtration by Means of a Laboratory Pressure Nutsche

Figure 15:
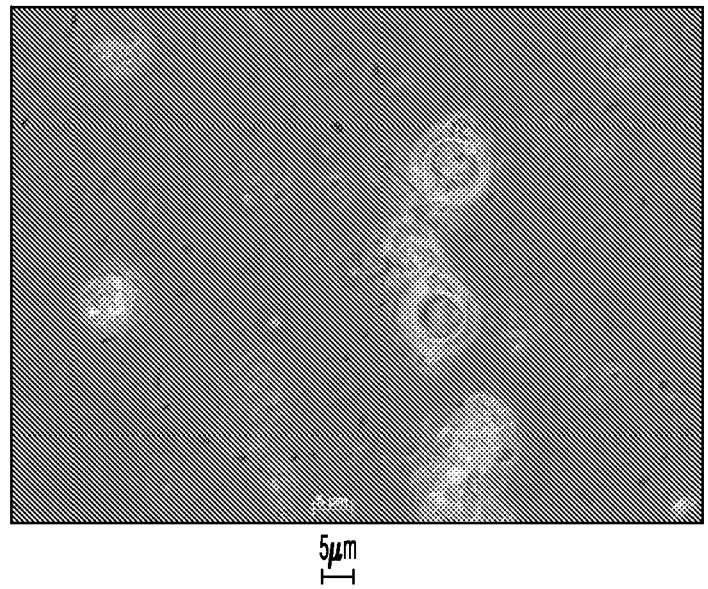
FIG. 15 shows a micrograph of the filter aid kieselguhr after the filtration of Example 3
Figure 16:
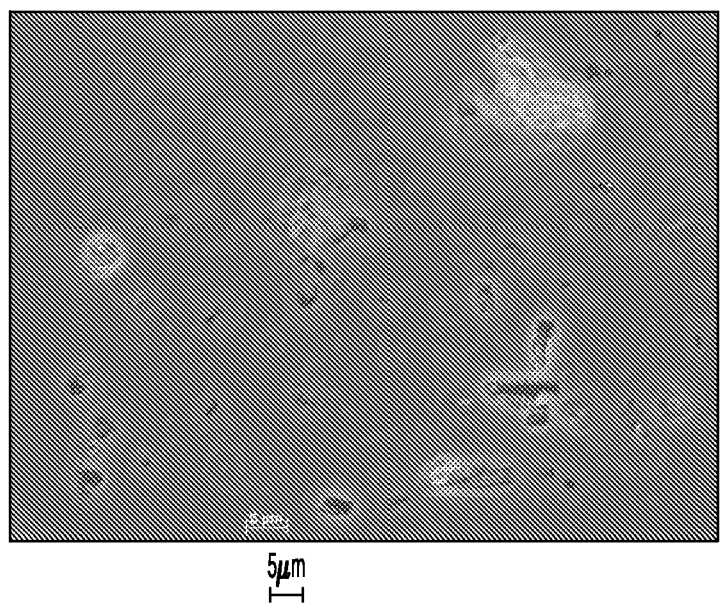
FIG. 16 shows a micrograph of the filter aid kieselguhr after the regeneration of Example 3

Example 3 was carried out in a similar manner to Example 2 using kieselguhr under the specification reported in Example 1. Enzyme: Cellufood AL 140®, from Bioprakt GmbH, Berlin. The amount of enzyme was 11 U/(EBC·hL). After regeneration was completed, filtration resistances of uncharged kieselguhr were compared with those of regenerated kieselguhr:

Filtration resistance fresh: 9.48 E12 mPas/m$^2$
Filtration resistance regenerated: 8.62 E12 mPas/m$^2$ Together with microscopic analysis, this shows the success of the regeneration (FIGS. 15 and 16.)

Example 4

Filtration Using a Kieselguhr-Cellulose Mixture by Means of a Candle Filter

The experimental procedure was performed in a similar manner to Example 1.

The precoating (1500 g/m$^2$) and the body feed (100 g/hL) both use a mixture of 20.0% by weight cellulose (Arbocel BE600/10, from J. Rettenmaier & Söhne) and 80.0% by weight kieselguhr. The kieselguhr proportion is in this case 25% of type DIC, 62.5% type CBR3 and 12.5% type CBL (Example 1).

Figure 17:
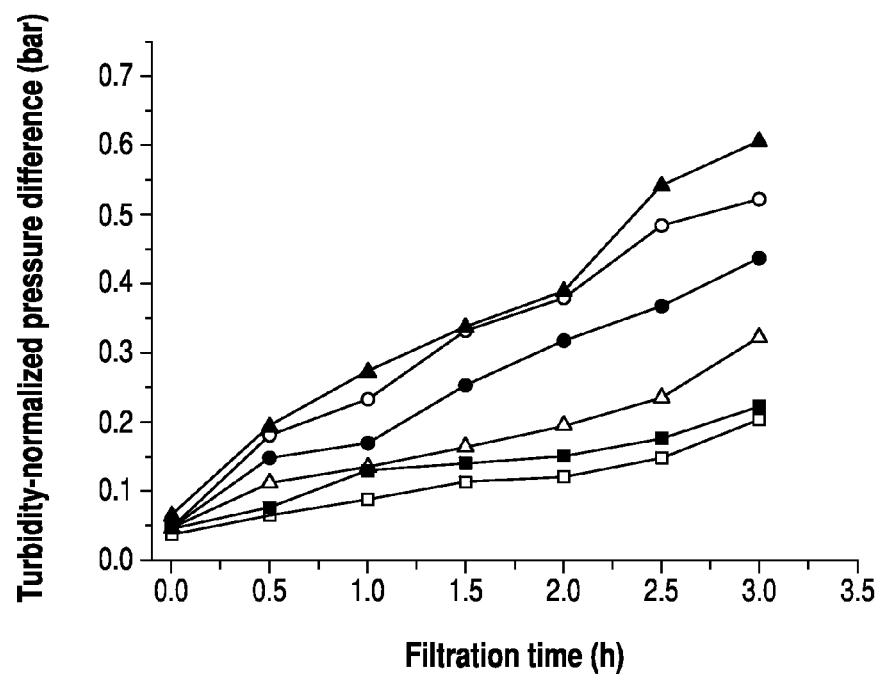
FIG. 17 shows the turbidity-normalized pressure difference as a function of the filtration time (normalization to 30 EBC))(25°) of Example 4 with the cycle numbers: □-1, ■-2, ∆-3, ▲-4, ●-5, ○-6
Figure 18:
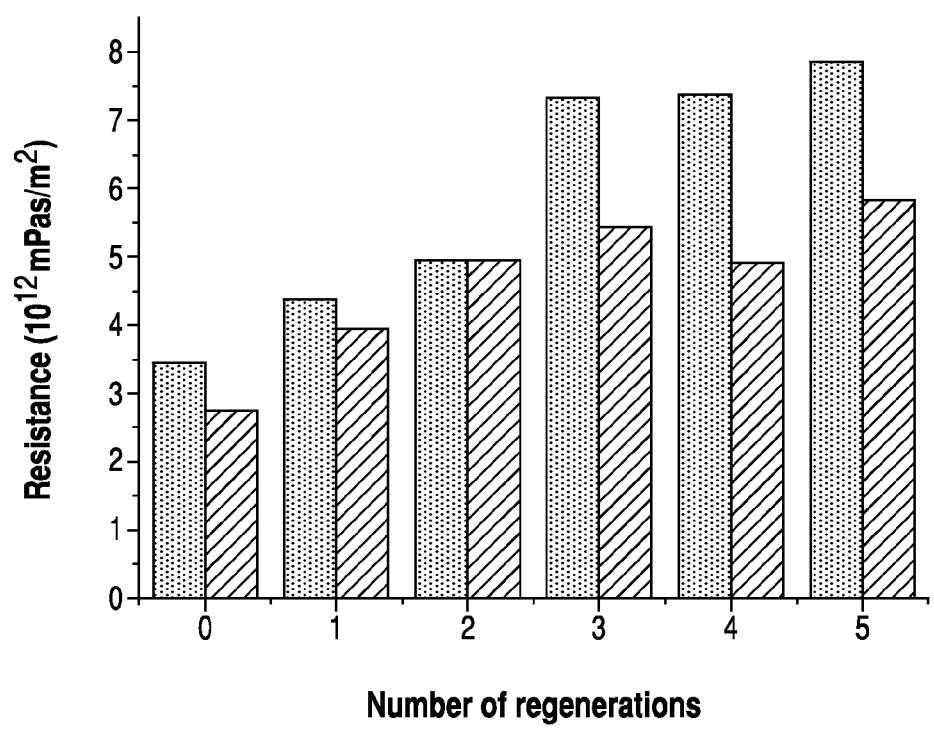
FIG. 18 shows the filtration resistances (gray) and washing resistances (hatched) as a function of the number of regenerations of the filter aids of Example 4
Figure 19:
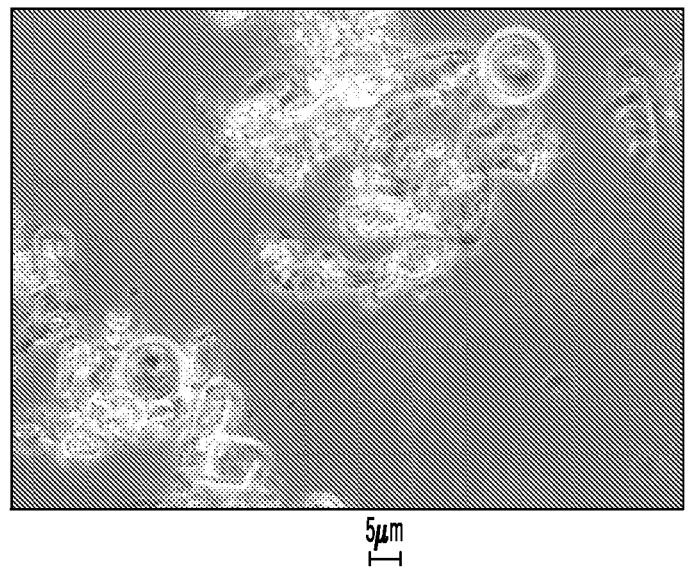
FIG. 19 shows a micrograph of the filter aid kieselguhr+cellulose after the $1^{st}$ filtration of Example 4
Figure 20:
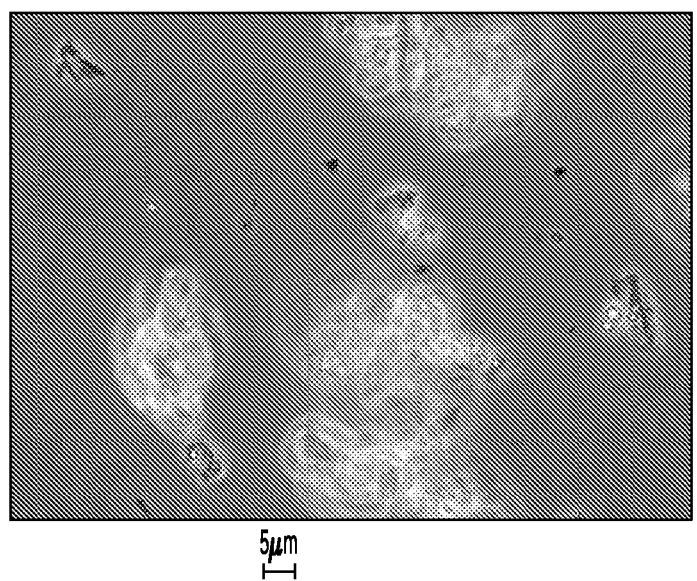
FIG. 20 shows a micrograph of the filter aid kieselguhr+cellulose after the $1^{st}$ regeneration of Example 1
Figure 21:
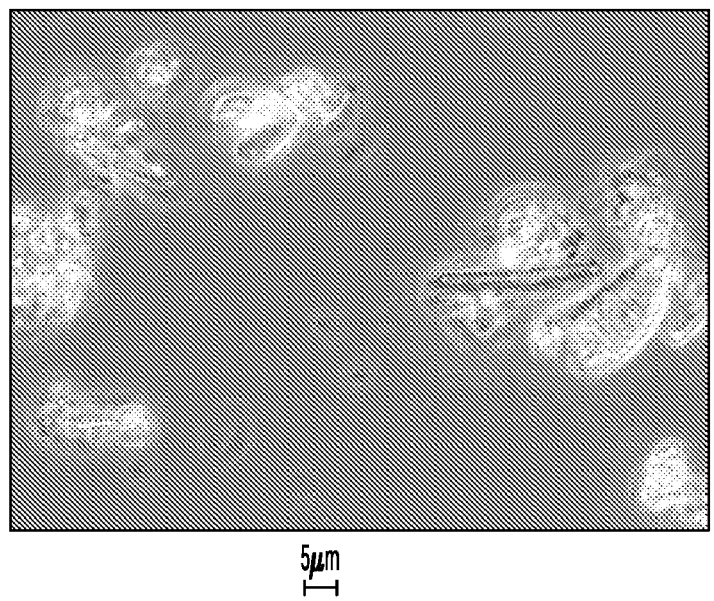
FIG. 21 shows a micrograph of the filter aid kieselguhr+cellulose after the 2$^{nd}$ regeneration of Example 4
Figure 22:
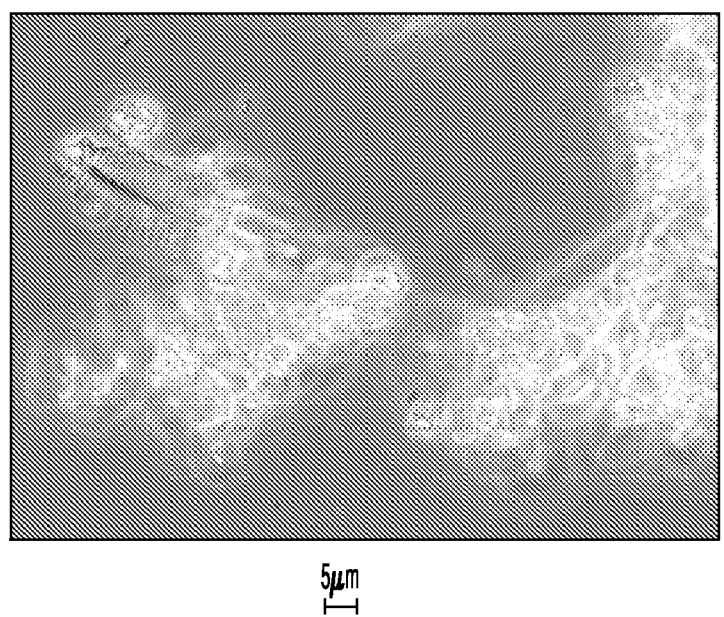
FIG. 22 shows a micrograph of the filter aid kieselguhr+cellulose after the 3$^{rd}$ regeneration of Example 4
Figure 23:
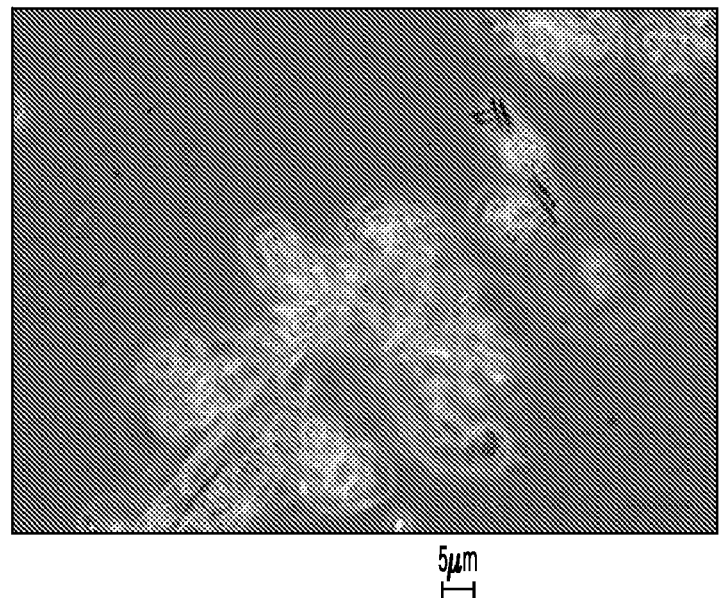
FIG. 23 shows a micrograph of the filter aid kieselguhr+cellulose after the 4$^{th}$ regeneration of Example 4
Figure 24:
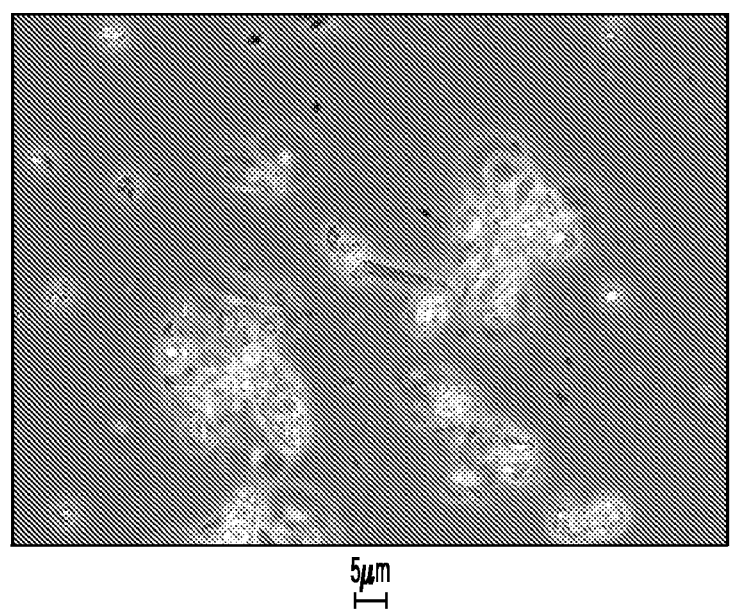
FIG. 24 shows a micrograph of the filter aid kieselguhr+cellulose after the 5$^{th}$ regeneration of Example 4
Figure 25:
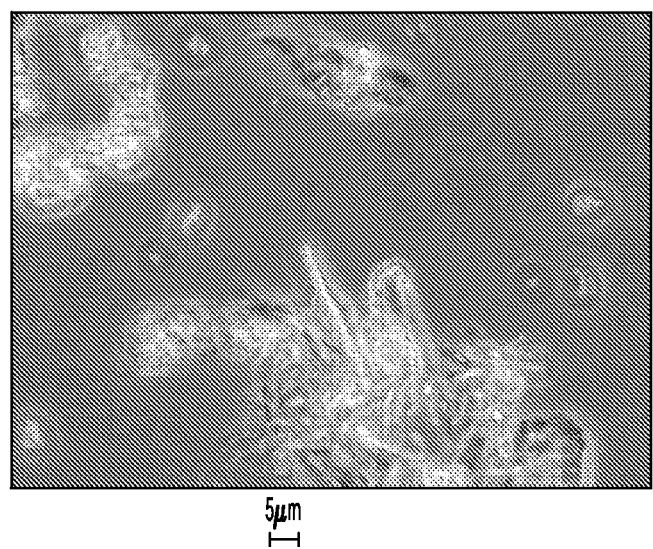
FIG. 25 shows a micrograph of the filter aid kieselguhr cellulose after the 6$^{th}$ regeneration of Example 4

The pressure-rise curves of Example 4 are shown in FIG. 17. 6 filtrations were carried out with intermediate regenerations. The amount of fresh product stated in each case (mixing ratio as at the start) was approximately 20%. The turbidity-normalized pressure increase rates of the regenerated materials are elevated compared with the fresh product, but acceptable at a maximum height of 0.2 bar/h. Furthermore, no continuous increase in pressure rate from cycle to cycle was present: the turbidity-normalized pressure rise in the 5$^{th}$ and 6$^{th}$ filtration was lower than in the 4$^{th}$ filtration. The filtration and washing resistances of the regenerated materials (FIG. 18) were $1·10^{13}$ mPas/m$^2$. With an increase from cycle to cycle, the increase is, however, digressive and not linear or exponential as is the case in an insufficient regeneration method. Successful regeneration is also confirmed by the microscopic investigation of the regenerated materials (FIGS. 19-25).

FIGS. 19-25 show micrographs of kieselguhr/cellulose after 1 to 6 cycles of the filtration and subsequent regeneration.

The invention claimed is:

1. A method of regenerating an inorganic, a natural and/or a semisynthetic filter aid which comprises:
    a) subjecting the filter aid to a first treatment with an aqueous alkaline solution,
    b) treating the filter aid with enzymes,
    c) treating the filter aid with a surfactant, and
    d) subjecting the filter aid to a second treatment with the aqueous alkaline solution,
    wherein the steps c) and d are carried out simultaneously.

2. The method of claim 1, wherein the filter aid is at least one selected from the group consisting of kieselguhr, perlite, aluminum oxide, glass, plant granules, wood fibers and cellulose.

3. The method of claim 1, wherein the aqueous alkaline solution is sodium hydroxide solution.

4. The method of claim 1, wherein the enzymes are yeast-cell-lysing enzymes.

5. The method of claim 1, wherein the enzymes are glucanases.

6. The method of claim 1, wherein the surfactant is an anionic or nonionic surfactant.

7. The method of claim 1, wherein the surfactant is sodium dodecyl sulfate.

8. The method of claim 1, wherein the surfactant is a fatty alcohol ethoxylate.

9. The method of claim 1, wherein the first treatment with aqueous alkaline solution proceeds on a filter cake.

10. The method of claim 1, wherein the first treatment with aqueous alkaline solution proceeds on an aqueous suspension or slurry of the filter aid.

11. The method of claim 1, wherein the enzyme treatment proceeds on an aqueous slurry or suspension of the filter aid.

12. The method of claim 1, wherein the surfactant treatment proceeds on an aqueous suspension or slurry of the filter aid.

13. The method of claim 1, wherein the surfactant treatment proceeds on a filter cake.

14. The method of claim 1, wherein the second treatment with aqueous alkaline solution proceeds on an aqueous suspension or slurry of the filter aid.

15. The method of claim 1, wherein the second treatment with aqueous alkaline solution proceeds on a filter cake.

16. The method of claim 1, further comprising performing a wash step between the steps a)-d).

17. The method of claim 16, wherein the wash step is performed with water.

* * * * *

UNITED STATES PATENT AND TRADEMARK OFFICE
CERTIFICATE OF CORRECTION

PATENT NO.       : 8,394,279 B2
APPLICATION NO. : 12/531388
DATED            : March 12, 2013
INVENTOR(S)      : Meffert et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 516 days.

Signed and Sealed this
First Day of September, 2015

Michelle K. Lee
*Director of the United States Patent and Trademark Office*